United States Patent [19]

Blanpied et al.

[11] Patent Number: 4,459,334
[45] Date of Patent: Jul. 10, 1984

[54] COMPOSITE BUILDING PANEL

[75] Inventors: Robert H. Blanpied, Dallas; Russell K. Odland, Plano; Walter Z. Vaden, Dallas, all of Tex.

[73] Assignee: Rmax, Inc., Dallas, Tex.

[21] Appl. No.: 408,939

[22] Filed: Aug. 17, 1982

Related U.S. Application Data

[63] Continuation of Ser. No. 309,565, Oct. 8, 1981, abandoned.

[51] Int. Cl.$^3$ .................. B32B 5/18; B32B 5/22; B32B 7/02; B32B 7/04
[52] U.S. Cl. .................... 428/219; 428/220; 428/285; 428/317.5; 428/319.1; 428/422.8; 521/118; 521/128; 521/172
[58] Field of Search .......... 428/317.5, 319.1, 422.8, 428/304.4, 219, 220, 285; 521/118, 128, 172; 156/79

[56] References Cited

U.S. PATENT DOCUMENTS

| | | | |
|---|---|---|---|
| 3,903,346 | 9/1975 | De Leon et al. | 428/319.1 |
| 3,940,517 | 2/1976 | De Leon et al. | 521/118 |
| 4,025,686 | 5/1977 | Zion | 428/285 |
| 4,028,158 | 6/1977 | Hipchen et al. | 156/79 |
| 4,073,997 | 2/1978 | Richards et al. | 428/319.1 |
| 4,118,533 | 10/1978 | Hipchen et al. | 428/319.1 |
| 4,130,614 | 12/1978 | Saidla | 428/319.1 |
| 4,204,019 | 5/1980 | Parker | 428/304.4 |
| 4,205,136 | 5/1980 | Ohashi et al. | 521/903 |
| 4,292,361 | 9/1981 | Ohashi et al. | 428/319.1 |
| 4,292,369 | 9/1981 | Ohashi et al. | 428/319.1 |
| 4,296,170 | 10/1981 | Ohashi et al. | 428/422.8 |

FOREIGN PATENT DOCUMENTS

| | | | |
|---|---|---|---|
| DE-OS 3008694 | 9/1980 | Fed. Rep. of Germany | 428/422.8 |
| DE-OS 3008699 | 9/1980 | Fed. Rep. of Germany | 428/319.1 |
| 55-27267 | 2/1980 | Japan | 428/319.1 |

Primary Examiner—William J. Van Balen
Attorney, Agent, or Firm—Hubbard, Thurman, Turner & Tucker

[57] ABSTRACT

A composite panel for use in the construction industry includes a core of foamed plastic material and a skin on at least one of its faces comprised of a two-ply material consisting of aluminum foil bonded to a mat of randomly oriented glass fibers into which the foam core has been expanded.

The core material comprises the rection product of isocyanurate and polyester/polyether polyol with the isocyanurate in sufficient excess to form trimmer rings and to react with the polyol to form urethane linkages.

Panels formed of the core material and the two-ply skins have excellent thermal insulation and fire retardant properties and the skins have excellent mechanical strength.

6 Claims, 1 Drawing Figure

COMPOSITE BUILDING PANEL

This is a Continuation of application Ser. No. 309,565, filed Oct. 8, 1981, now abandoned.

BACKGROUND OF THE INVENTION

The present invention relates to composite panels for use in the construction industry. As is well known in the art, composite panels have been widely used in the formation of walls and roofs to incorporate heat insulation therein. Known composite panels comprise a core of foamed plastic materials with outer protective skins of, e.g. aluminum foil. Many different foamed plastic materials have been used for the core and the choice of a particular plastic will depend on cost and the physical and thermal insulation properties required. It is an object of the present invention to provide a novel panel comprising a unique facing skin, which imparts considerable physical improvement and protection to the product, a unique plastic foam, and a method of manufacture which facilitates adhesion of the facing skin to that core.

It is a further object of the present invention to provide a new and improved composite building panel. In particular, the present invention provides a composite building panel with significantly improved dimensional stability coupled with increased mechanical strength.

SUMMARY OF THE INVENTION

According to one aspect of the present invention, there is provided a composite building panel comprising a core of rigid foamed plastic material, such as an isocyanurate foam, having secured to its front and back surfaces facing skins, each said facing skin comprising an outer surface of thin aluminum foil bonded to a nonwoven mat of randomly oriented glass fibers. The core of foamed material is formed in situ between two spaced-apart facing skins using techniques well established in this art. Because the glass fiber mat is non-woven and is a relatively open structure, the foam, as it is formed, expands into and through the mat which ensures adhesion of the outer skin to the foam core, increasing the adhesion of the foil to glass mat.

The glass fiber mat may be formed using conventional wet forming equipment in which the wetted glass mat is formed in the presence of a binder. The weight of glass fiber may be in the region of between about four and thirty pounds per 1,000 square feet, and preferably between about seven and fifteen pounds per 1,000 square feet, depending on the particular type of application of the material. An organic resin binder is used in the formation of the glass mat. The diameter of the glass fibers range between about 6 and 16 microns. The glass fibers are relatively short, having a nominal length between about ¼ of an inch and 1 inch.

In known composite panels employing facing skins of aluminum foil, the aluminum foil has been a "full hard" temper (non-annealed) foil of about 0.0010 to 0.0015 inch thickness. This foil is difficult to cut during fabrication, and where it is cut, jagged edges remain which are a substantial hazard to the safety of the personnel using the material on the construction site. Moreover, this full hard foil is difficult to process without damaging its surface, i.e., without causing it to wrinkle. As the foil is usually over-printed with technical or commercial information, wrinkling produces an unsatisfactory final product. The danger of users being cut by jagged edges could be avoided by using dead soft aluminum foil of 0.001 inch thickness, but such foil would not have sufficient tensile strength for production purposes, nor would the resultant composite board have sufficient mechanical strength in use.

Further problems have been experienced with full hard aluminum foil covered panels which are easily punctured due to the brittleness of the foil. A panel of this type of foam insulation with a punctured surface will lose insulation value in the area of the puncture quite rapidly. A further problem that has been experienced is the dimensional stability of the prior art composite panels which have exhibited considerable variation in size under the varying conditions of temperature and humidity to which they are exposed in use. This has proved a particularly severe problem in the case of panels used for roofing purposes. In this connection, it has been proposed to improve dimensional stability by forming the core around an ordered array of long, straight, particles of glass fibers, (see U.S. Pat. Nos. 4,028,158 and 4,118,533, to Hipchen, et al.).

Embodiments of the invention employing aluminum foil in the skin have produced an improved fire resistant board, which can be formulated so as to provide a tough, lightweight roof insulation which offers several superior fire resistance ratings. The material in this preferred form comprises outer surfaces of dead soft, fully annealed aluminum foil of approximately 0.0003 to 0.0008 inch (0.0076 mm to 0.025 mm) thickness, with the preferred range being 0.0005 inch to 0.0008 inch (0.0127 mm to 0.025 mm).

The bonding of the glass mat to the aluminum foil imparts considerable surface strength to the foil, greatly improving the overall puncture resistance and resistance to wrinkling. In addition, the glass mat increases the resistance of the board to bending, that is to say, it increases the flexural strength of the composite board. Moreover, the intimate engagement between the foam core and the mat, substantially reduces changes of dimension of the foam which might otherwise occur at extremes of humidity and temperatures. Moreover, since the aluminum is essentially adhered directly to the core, potential delamination problems are avoided.

According to another aspect of the invention, the unique plastic foam core is produced using a polymeric isocyanate which is reacted with itself to form trimer rings and also with a polyester/polyether polyol to form urethane linkages: the resultant plastic foam has unusually low flammability characteristics. The polyether polyol is obtained by alkyloxidation of either plain sucrose, or an amine-sucrose blend with propylene oxide and capped, or chain-terminated, with ethylene oxide. The polyester polyol is obtained from transesterification of dimethylterephthalate process side-streams with various glycols, including diethylene glycol. The polyol blend is comprised of between about 40%–60% dimethylterephthalate/glycol based polyester polyol mixed with between about 60%–40% alkyloxylated sucrose based polyether polyol. The alkyloxylated sucrose polyol provides compatability with the chlorofluorocarbon blowing agent. The polyester polyol provides superior char formation and fire retardancy.

The final relative percentage of isocyanurate trimer rings formed as compared to urethane linkages is controlled by the ratio of chemical equivalents of -NCO (isocyanate) groups to -OH (hydroxyl) groups as well as the catalyzation employed. The plastic core of the present invention may have an isocyanate- to hydroxyl-group ratio in the range of between about 1.8:1 to 6.0:1 and is preferably about 4.0:1.

Composite panels based on an isocyanurate core have been proposed in U.S. Pat. Nos. 4,204,019 to Parker, and 3,903,346 and 3,940,517, both to DeLeon. However, there is no suggestion in any of these Patents of using a polyester/ polyether polyol as the urethane modifier to the isocyanurate. The excellent physical properties of the present foam are not produced using the Parker components, nor the technology described in these U.S. Patents.

DESCRIPTION OF THE DRAWING

The inventions will now be described in more detail with reference to the accompanying drawings in which.

DETAILED DESCRIPTION OF THE INVENTION

Figure 1:
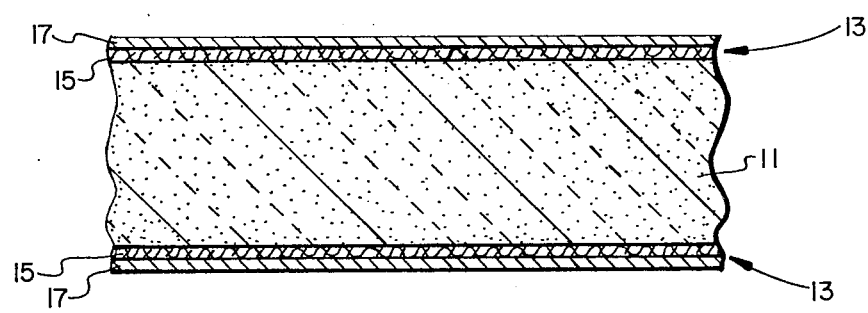
FIG. 1 shows a cross-section through a first insulating panel embodying the invention, and the thickness of the two-ply skins being much enlarged for the purpose of illustration.

Referring to FIG. 1, a lightweight roof insulation panel is shown comprising an isocyanurate foam core 11 covered on its upper and lower surfaces by a two-ply skin 13. The skin 13 comprises an inner mat 15 of randomly arranged glass fibers and an outer layer 17 of aluminium foil. The glass fiber mat 15 is fabricated by wet forming the glass fiber mat using glass fibers with diameters between about 6 and 16 microns and between about $\frac{1}{4}$ of an inch and 1 inch in length. The wet processing is carried out on a conventional wet forming machine in the presence of an organic resin binder. Thereafter, the two-ply skin 13 is fabricated by adhesion lamination using a conventional casein-latex, polyvinylidene-butadiene, a PVdC-polystyrene copolymer latex emulsion, or a similar type adhesive, to the desired aluminum foil. The aluminum foil used is a dead soft, fully annealed foil approximately 0.0003 inches to 0.0008 inches thick.

The resultant two-ply skin material is then used as upper and lower facing sheets in the continuous formation of laminated boards by in situ foaming of the isocyanurate, using techniques well known in the art and the novel formulation of the present invention.

The foam core is produced from a two component mixture comprised of a polyisocyanate (A component) and a polyol blend (B component) using high pressure impingement mixing techniques. Low pressure mixing equipment could also be used. One of the advantages of this invention is that a polyisocyanurate foam is produced without adding any other material to the polyisocyanate (A component). In the previously referred to isocyanurate core foam patents, U.S. Pat. Nos. 4,204,019, 3,903,346 and 3,940,517, some further component has to be added to the A component blend to produce the polyisocyanurate foam. The advantage of the present invention, therefore, is that existing commercial equipment which has a mixing ratio of 1 to 1 can be used. Therefore, in all discussions following it is understood that the polyisocyanate (A component) is used neat without any mixing or further dilution.

The polyol blend (B component) can be made up in the normal urethane blending fashion which includes adding to the polyol a fluorocarbon blowing agent. The preferred agent is trichlorofluoromethane, $CCl_3F$, but other suitable agents such as trichlorotrifluoroethane, $CCl_2FCClF_2$, methylene chloride, or water may be used. These various blowing agents can be obtained from DuPont of Wilmington, Del., Allied Chemical Corporation of New York, N.Y., and Kaiser Chemical Company of Oakland, Calif. The blowing agents may be stabilized with an acid scavenger such as monomeric styrene or alloocimine. The polyol blend (B component) also contains a surfactant, which is preferably a silicone-containing polymeric surfactant more preferably from the generic family of polydimethylsiloxane polyoxyalkylene block copolymers.

Another advantage of the present invention is that a surfactant containing hydroxyl (-OH) groups may be used, which increases the range of products from which the surfactant may be selected. Such products are DC-193 from Dow Corning of Midland, Mich., L-5420 from Union Carbide of New York, N.Y., and P-9475 from Pelron Corporation of Lyon, Ill. In the prior art systems, a non-hydrolizable, non-reactive surfactant, i.e, one which does not contain significant -OH groups, must be used, since the surfactant will be added to the A component.

Another component of the polyol blend is the catalyst system which must promote both the urethane reaction and the trimerization reaction of polyisocyanate. It has been discovered that the catalyst system must have both the properties of a tertiary amine and also the properties of an organic salt such as quaternary ammonium compound or else a metal carboxylate salt, such as potassium 2-ethylhexoate or potassium acetate. The preferred organic metal salt is potassium 2-ethylhexoate. This material can be purchased from Mooney Chemicals Incorporated of Cleveland, Ohio with the trade name potassium Hex-Cem 977 which contains 15% potassium in a carrier of diethylene glycol. Another organic compound which can be used as the co-catalyst is a quaternary ammonium compound such as Dabco TMR catalyst produced by Air Products and Chemicals Company of Allentown, Pa. These amine salts are suspended in glycols. The quaternary ammonium salt catalyst provides both the necessary amine content as well as the metallic salt catalytic activity. When the metal carboxylate is used, however, it must have with it a amine catalyst such as 2, 4, 6, trisdimethylaminomethylphenol. This catalyst is sold by the trade name of DMP-30 produced by Rohm & Haas Company of Philadelphia, Pa., P-9529 produced by Pelron Corporation of Chicago, Ill., and EH-300 produced by Thiokol Chemical Corporation of Trenton, N.J. All of these catalyst components must be used in an amount which will promote the reaction required. Typically the amounts to be added are between 0.5% and 3.5% of the polyol blend (B component). A key ingredient in the polyol blend is the unique blend of the polyether polyol and the polyester polyol. The polyester polyol is made from a derivative of the dimethlyterephthalate process. This ester is then transesterified with a glycol, such as diethylene glycol, to produce a compound with an average hydroxyl functionality of between 2.0 and 2.5. Other compounds present which also engage in the transesterification reaction include the aromatic polyesters derived from polycarbomethoxy-substituted diphenyls, polyphenyls and benzyl esters of the toluate family. Such a product may be purchased from Hercules Incorporated, Wilmington, Del. under the trade name TERATE. Preferably TERATE 202 or 203 is used in compounding the base polyol. The other part of the polyol compound consists of a highly alkyloxylated sucrose base polyol. In the past, most alkyloxylated sucrose polyols have had hydroxyl numbers in the range of about 480 to 530. These have produced compounds with rather high viscosities. To overcome the high viscosity of the polyester polyol, it is advantageous to carry the alkyloxylation of the sucrose to a higher level producing lower hydroxyl numbers. This processing tends to lower the viscosity as well as increasing the solubility of this polyol blend in CFC-11.

Examples I and II below are specific examples of component mixtures which can be used to produce the foam core of this invention. Example I produces a -NCO to -OH ratio of 4:1. This ratio is known as a 4 index (or a 400 index. Example II produces an active isocyanate to active hydroxyl ratio of 2:1 to produce a 2 index foam.

EXAMPLE I (4 Index Foam)

|  | Parts by Weight |
|---|---|
| A Component |  |
| Polyisocyanate (Rubinate M) | 189 |
| B Component |  |
| Polyol (BM 361-L) | 62.5 |
| Blowing Agent (K-11B2) | 32.3 |
| Surfactant (DC-193) | 2.2 |
| Metal Carboxylate (Hex-Cem 977) | 2.3 |
| Amine, 2, 4, 6, -tris (dimethylaminomethyl) phenol DMP-30, of Rohm & Haas Company. | 0.7 |
| B Component Subtotal | 100 |
| TOTAL: | 289 |

EXAMPLE II (2 Index Foam)

|  | Parts by Weight |
|---|---|
| A Component |  |
| Polyisocyanate (Rubinate M) | 102 |
| B Component |  |
| Polyol (BM 361-L) | 67.5 |
| Blowing Agent (K-11B2) | 28.0 |
| Surfactant (DC-193) | 1.5 |
| Metal Carboxylate (Hex-Cem 977) | 2.3 |
| Amine (DMP-30) | 0.7 |
| B Component Subtotal | 100 |
| TOTAL: | 202 |

To produce the foam, using the components of either Example I or Example II, the five ingredients of the B component are pre-mixed in a closed vessel at room temperature for at least fifteen minutes. The A component and the mixed B component is then passed, with the A component, through heat exchangers to maintain a temperature of between about 60°-80° F. and preferably in the 70°-75° F. range. The components are then mixed and deposited for foam formation using commercially available equipment, for example, that produced by the Hennecke Machinery Division of Mobay Chemicals. Using such equipment, the laminate board is produced by depositing the mixed A and B components between two spaced-apart continuous webs of the above described two-ply skin material on a laminator having two parallel conveyor belts. A suitable laminator is produced by the Hennecke Machinery Division of Mobay Chemicals. The laminator air and belt temperatures should be between about 120°-200° F. and preferably in the range of 150°-180° F. The resultant board laminate is cut to the desired width and length. Because of the relative lack of hardness of the aluminium foil, as compared with the 0.001 to 0.0015 inch thick foil hitherto used in aluminum foil covered boards, the board-stock which results can be trimmed without the formation of sharp edges which have, heretofore, endangered the safety of construction personnel using the products.

Board produced according to the above described specification and method exhibit excellent dimensional stability and fire resistance, as shown by the ASTM E-84 Flame Spread, the ICBO Room Corner fire test, and the Factory Mutual Calorimeter fire testing. In certain roof construction, the boards are approved for use in attaining the best fire ratings, such as Factory Mutual Class I steel roof deck constructions, or Underwriting Laboratories, Inc., Outline #1256 and Standard #790.

Insulating board produced as described above has been designed specifically for single-ply membrane roofs, but could be used for hot asphalt mopped, built-up roofs, due to its superior surface strength. It can be used directly over steel roof decks without additional gypsum or perlite fire rated base layers. In use, the board can be secured to the roofing deck using hot steep asphalt, cold adhesive or mechanical fasteners. In the case of metal decks, mechanical fasteners would be most appropriate. A superior roof insulation job at the lowest possible cost is obtained using the above described insulating board and a single-ply membrane. Moreover, since the insulating panel is foil covered, a slip sheet may not be required between the insulation and the single-ply membrane.

In addition to the particularly advantageous product obtained using the unique core material in combination with the unique facing material as described above, the present invention also encompasses the use of the unique core with other facing materials. For example, the core 11 above can be bonded on one board side to a facing skin of 0.001 inch aluminum foil which has been properly prepared with an organic coating, and to the unique two-ply aluminum foil/fiber glass material on the other board side. This board has cost advantages over the product with foil/glass on both sides, but the physical properties of the product with glass/foil skin on both sides are better. Similarly, if damage resistance is not as important, useful board can be produced by laminating 0.001 inch aluminum foil to both sides of a core produced as the core 11 described above.

What is claimed is:
1. A composite building panel comprising:
a core of rigid foamed plastic material;
protective facing material secured to the front and back surfaces of said core;
wherein said foamed core comprises the catalyzed reaction product of isocyanate and a blended polyester/polyether polyol which comprises between about 40%-60% dimethylterephthalate/glycol based polyester polyol mixed with between about 60%–40% alkyloxylated sucrose, or sucrose-amine, based polyether polyol wherein the isocyanate is in sufficient excess to form isocyanurate (trimer) rings and also to react with the polyester/polyether polyol to form urethane linkages.

2. A composite building panel as claimed in claim 1 wherein the foam core has an isocyanate- to hydroxyl-group ratio of between about 1.8:1 and 6.0 to 0:1.

3. A composite building panel as claimed in claim 1 wherein at least one of said protective facing materials includes a skin comprising an outer layer of aluminum foil of approximately 0.0003 inch to 0.0008 inch thickness, backed by and bonded to a mat of randomly oriented glass fibers, said mat being penetrated by said foam to adhere said skin to said core.

4. A composite building panel, according to claim 3, wherein the mat comprises glass fibers in the range of 6 to 16 microns in diameter and between about ¼ of an inch and 1½ inch in nominal length.

5. A composite panel, according to claim 4, wherein the mat comprises between about four and thirty pounds of glass fiber per 1,000 square foot of mat.

6. A method of forming a foam core for a composite building panel comprising:
providing a polyisocyanate component and a polyol component, said polyol component comprising between 40%–60% dimethylterephthalate/glycol based polyester polyol mixed with between about 60%–40% alkyloxylated sucrose, or sucrose-amine, based polyether polyol;
a catalyst, mixture having the catalytic properties of both an organic salt and a tertiary amine;
a fluorocarbon blowing agent, and
a surfactant mixing the polyisocyante component and the polyol component in proportion between about 1:1 and 2:1 and forming therefrom a foam reaction product resulting from trimerization of the polyisocyanate plus the reaction of the polyisocyanate with the polyol to form urethane linkages.

* * * * *